(12) United States Patent
Loidl

(10) Patent No.: US 8,733,096 B2
(45) Date of Patent: May 27, 2014

(54) HEAT ENGINE

(76) Inventor: Walter Loidl, Vienna (AT)

( * ) Notice: Subject to any disclaimer, the term of this patent is extended or adjusted under 35 U.S.C. 154(b) by 333 days.

(21) Appl. No.: 12/811,550

(22) PCT Filed: Dec. 22, 2008

(86) PCT No.: PCT/AT2008/000469
§ 371 (c)(1),
(2), (4) Date: Jul. 2, 2010

(87) PCT Pub. No.: WO2009/082773
PCT Pub. Date: Jul. 9, 2009

(65) Prior Publication Data
US 2010/0287929 A1    Nov. 18, 2010

(30) Foreign Application Priority Data

Jan. 3, 2008 (AT) .................................... A 7/2008

(51) Int. Cl.
*F01B 29/00* (2006.01)
*F02G 1/04* (2006.01)
*F01K 7/00* (2006.01)

(52) U.S. Cl.
USPC ................................ 60/512; 60/508; 60/515

(58) Field of Classification Search
USPC .................................................. 60/508–526
See application file for complete search history.

(56) References Cited

U.S. PATENT DOCUMENTS

| 3,805,528 | A | * | 4/1974 | Huebscher | ...................... 60/530 |
| 4,418,547 | A | * | 12/1983 | Clark, Jr. | ........................ 62/116 |
| 4,450,690 | A | * | 5/1984 | Clark, Jr. | ........................ 62/116 |
| 4,452,047 | A |   | 6/1984 | Hunt et al. | |
| 4,498,302 | A | * | 2/1985 | Djelouah | ........................ 60/671 |
| 4,617,801 | A | * | 10/1986 | Clark, Jr. | ........................ 62/116 |

(Continued)

FOREIGN PATENT DOCUMENTS

| CH | 521516 | 4/1972 |
| DE | 2525534 | 12/1976 |
| DE | 10126403 | 12/2001 |
| OA | 11253 | 7/2003 |

OTHER PUBLICATIONS

International Preliminary Report on Patentability issued Oct. 28, 2010 from related International Application No. PCT/AT2008/000469.

(Continued)

*Primary Examiner* — Thomas Denion
*Assistant Examiner* — Steven D Shipe
(74) *Attorney, Agent, or Firm* — Hoffmann & Baron, LLP

(57) ABSTRACT

Heat engine with at least two cylinder-piston units, each containing an expansion fluid, which stands under a prestressing pressure and which changes its volume in the case of a change of temperature and thus moves the piston, elements for the individually controllable supply of heat to the expansion fluid of each cylinder-piston unit, and a control means controlling the heat supply elements to allow each expansion fluid to alternately heat up and cool down and thus move the pistons, wherein a common prestressing fluid acts on the pistons of all cylinder-piston units in order to exert a common prestressing pressure on the expansion fluids, the control means is fitted with a pressure gauge for the prestressing pressure, and the control means controls the heating and cooling phases of the heat supply elements in dependence on the measured prestressing pressure in order to hold the prestressing pressure within a predetermined range.

21 Claims, 3 Drawing Sheets

(56) References Cited

U.S. PATENT DOCUMENTS

| | | | | |
|---|---|---|---|---|
| 4,981,014 A * | 1/1991 | Gallagher | | 60/412 |
| 5,345,769 A * | 9/1994 | Liepert et al. | | 62/6 |
| 5,916,140 A * | 6/1999 | Hageman | | 60/525 |
| 5,927,080 A * | 7/1999 | Lee | | 62/6 |
| 6,250,078 B1 * | 6/2001 | Amendola et al. | | 60/509 |
| 6,272,855 B1 * | 8/2001 | Leonardi | | 60/513 |
| 6,708,945 B2 * | 3/2004 | Horiuchi et al. | | 251/11 |
| 8,104,274 B2 * | 1/2012 | McBride et al. | | 60/410 |
| 8,109,085 B2 * | 2/2012 | McBride et al. | | 60/413 |
| 8,117,842 B2 * | 2/2012 | McBride et al. | | 60/613 |
| 8,122,718 B2 * | 2/2012 | McBride et al. | | 60/613 |
| 8,171,728 B2 * | 5/2012 | Bollinger et al. | | 60/408 |
| 8,191,362 B2 * | 6/2012 | McBride et al. | | 60/418 |
| 2005/0155347 A1 * | 7/2005 | Lewellin | | 60/508 |
| 2006/0081376 A1 * | 4/2006 | Reid | | 166/335 |
| 2009/0038307 A1 | 2/2009 | Smith et al. | | |
| 2011/0005237 A1 * | 1/2011 | Matteson et al. | | 62/6 |
| 2011/0083438 A1 * | 4/2011 | McBride et al. | | 60/682 |
| 2011/0100002 A1 * | 5/2011 | Muir et al. | | 60/641.2 |

OTHER PUBLICATIONS

International Search Report dated Dec. 22, 2008 issued in priority application (Form PCT/ISA./210).
Form PCT/ISA/237.
AU Patent Examination Report of Sep. 13, 2012.

* cited by examiner

HEAT ENGINE

CROSS-REFERENCE TO RELATED APPLICATIONS

This application is a National Phase application of International Application No. PCT/AT2008/000469 filed Dec. 22, 2008 which claims priority to Austrian Patent Application No. A 7/2008, filed Jan. 3, 2008.

BACKGROUND OF THE INVENTION

The present invention relates to a heat engine, in particular for low-temperature operation for the utilisation of solar heat, waste heat from biological or industrial processes or the like, with at least two cylinder-piston units, each containing an expansion fluid, which stands under prestressing pressure and which changes its volume in the case of a change of temperature and thus moves the piston, elements for the individually controllable supply of heat to the expansion fluid of each cylinder-piston unit, and a control means controlling the heat supply elements to allow each expansion fluid to alternately heat up and cool down and thus move the pistons.

Such a heat engine is known from U.S. Pat. No. 5,916,140. Effective expansion fluids frequently require a specific prestressing pressure in order to show a significant coefficient of expansion in the desired operating temperature range. An example of this is liquid carbon dioxide, which changes its volume by about 2.2-fold when heated from 20° C. to 30° C. at a pressure of approx. 60-70 bar.

U.S. Pat. No. 5,916,140 discloses different variants to place the expansion fluid in the cylinder-piston units under the required prestressing pressure. On the one hand, metal or gas springs are proposed to prestressing the pistons in the direction of the expansion fluid. However, no prestressing pressure independent of the piston movement can be reached with such a distance-dependent spring force. On the other hand, a mechanical coupling of two cylinder-piston units by means of a crankshaft or by opposed cylinder assembly is described, so that the respectively extending piston maintains the prestressing pressure on the expansion fluid of the retracting piston. However, such a rigid coupling requires that the heating and cooling phases are about equal in length, since otherwise a piston that retracts too slowly will hinder the extending one, which is detrimental to efficiency, or a piston that extends too slowly will generate too little prestressing pressure to assure operation.

It is proposed in U.S. Pat. No. 5,916,140 as a solution to the last-mentioned problem to accelerate the cooling phase by removing heat as rapidly as possible, so that it is always shorter than the heating phase. However, this is scarcely realisable in practice, since highly variable heat supply is to be expected especially when using solar heat. Thus, for heating liquid carbon dioxide from 20° C. to 30° C. at midday, for example, a heat supply temperature of 70° C. and thus a temperature difference of 40-50° C. may be available, whereas for cooling from 30° C. to 20° C. there is only a temperature difference of 15-25° C.—even in the case of forced cooling with cold water at 5° C.—, and as a result a cooling phase that is about double the length of the heating phase is to be expected. On the other hand, in the morning and evening hours the temperature level of the solar plant may also only amount to 30°-40° C., for example, and as a result of which a heating phase that is longer than the cooling phase may even be expected.

SUMMARY OF THE INVENTION

Therefore, the aim set by the invention is to provide a heat engine of the aforementioned type, which always achieves a good efficiency even with highly fluctuating heat supply. This aim is achieved according to the invention in that a common prestressing fluid acts on the pistons of all cylinder-piston units in order to exert a common prestressing pressure on the expansion fluids, the control means is fitted with a pressure gauge for the prestressing pressure, and the control means controls the heating and cooling phases of the heat supply elements in dependence on the measured prestressing pressure in order to hold this within a predetermined range.

This enables a variable dynamic coupling of the cylinder-piston units to be achieved. Control of the piston movement dependent on the prestressing pressure prevents a deterioration in the efficiency of the engine as a result of an unnecessarily high prestressing pressure, while always assuring the necessary prestressing pressure for the expansion fluid. As a result, a constantly optimum operation is achieved even under changing ambient conditions.

A particularly advantageous embodiment of the heat engine according to the invention has at least three cylinder-piston units, and is distinguished in that the control means increases the number of cylinder-piston units, which are in the heating phase at a point in time, in relation to the number of cylinder-piston units, which are in the cooling phase at the same point in time, if the prestressing pressure drops below the predetermined range, and reduces same if the prestressing pressure exceeds the predetermined range. This allows the operation to be adapted to particularly highly fluctuating ambient conditions. For example, in the low-temperature morning or evening hours of a solar plant an about equal number of cylinder-piston units can be operated in the heating and cooling phases, while in the midday heat few rapidly heating cylinder-piston units are countered by many slowly cooling cylinder-piston units.

According to a further feature of the invention, the control means can also reduce or extend each individual heating and/or cooling phase for fine adjustment in order to hold the prestressing pressure within the predetermined range.

In principle, any fluid known in the art with an appropriately substantial coefficient of thermal expansion can be used as expansion fluid. It is particularly favourable if—as known from U.S. Pat. No. 5,916,140—the expansion fluid contains liquid carbon dioxide and the prestressing pressure is higher than or equal to the condensation pressure of carbon dioxide at the operating temperature. Because of its high coefficient of thermal expansion at room temperature, liquid carbon dioxide is particularly suitable for operation of the heat engine in the low-temperature range for the utilisation of solar heat, waste heat from biological or industrial processes or the like. Moreover, carbon dioxide formed from combustion processes can thus be fed to a beneficial secondary treatment process, in which it does not have any environmentally unfriendly greenhouse effect. The heat engine according to the invention therefore also makes a contribution to environmentally favourable $CO_2$ sequestration in the sense of a carbon dioxide capture and storage process (CSS).

The prestressing fluid can also be of any desired type, e.g. compressed air. However, it is particularly preferred if the prestressing fluid is hydraulic fluid, which provides a non-positive and reliable pressure coupling. In this case, the hydraulic circuit of the prestressing fluid is preferably fitted with a flexible intermediate reservoir, so that short-term pressure fluctuations during switchover operations or in the case of individual reductions or increases of the heating and cooling phases necessary for control can be temporarily absorbed.

The action of the prestressing fluid on the pistons can occur in a wide variety of ways, e.g. by mechanically coupling separate hydraulic prestressing cylinders to the cylinder-piston units. The pistons of the cylinder-piston units are preferably configured as double-action pistons, the expansion fluid acting on one side thereof and the prestressing fluid acting on the other side thereof, which results in a particularly simple structure.

The decoupling of the work performed by the cylinder-piston units can also be achieved in any desired manner known in the art, which takes into consideration the generally non-sinusoidal courses and different phase positions of the reciprocating movements of the individual pistons, e.g. by means of free-wheeling hubs, planetary gear trains, ratchet/pawl mechanisms etc. A hydraulic decoupling of the movement work, in which each cylinder-piston unit drives a working piston and all working pistons act on a common working fluid of a hydraulic load, is particularly favourable.

A preferred embodiment of the invention is distinguished in that the heat supply elements have a heat exchanger, through which a heat transfer medium flows and which is provided with a shut-off valve controlled by the control means. The time points and durations of the heating phases can be preset by simply opening and closing the shut-off valves, and the cooling phases then result between these.

The cooling phases can be accelerated if the heat supply elements preferably also comprise elements for forced cooling of the expansion fluids in the cooling phases. It is particularly favourable for this purpose if the heat transfer medium stands under pressure in the heating phase and the forced cooling elements have a controllable pressure release means for each heat exchanger. As a result, the heat transfer medium can be simultaneously used as coolant by it causing cooling as a result of pressure release.

The pressure release means preferably comprises a vacuum intermediate reservoir, which can be switched to the heat exchanger by means of a controllable switch valve, as a result of which a sudden release and therefore a particularly rapid cooling can be achieved.

BRIEF DESCRIPTION OF THE DRAWINGS

The invention shall be explained in more detail below on the basis of exemplary embodiments illustrated in the attached drawings.

DETAILED DESCRIPTION OF THE INVENTION

Figure 1:
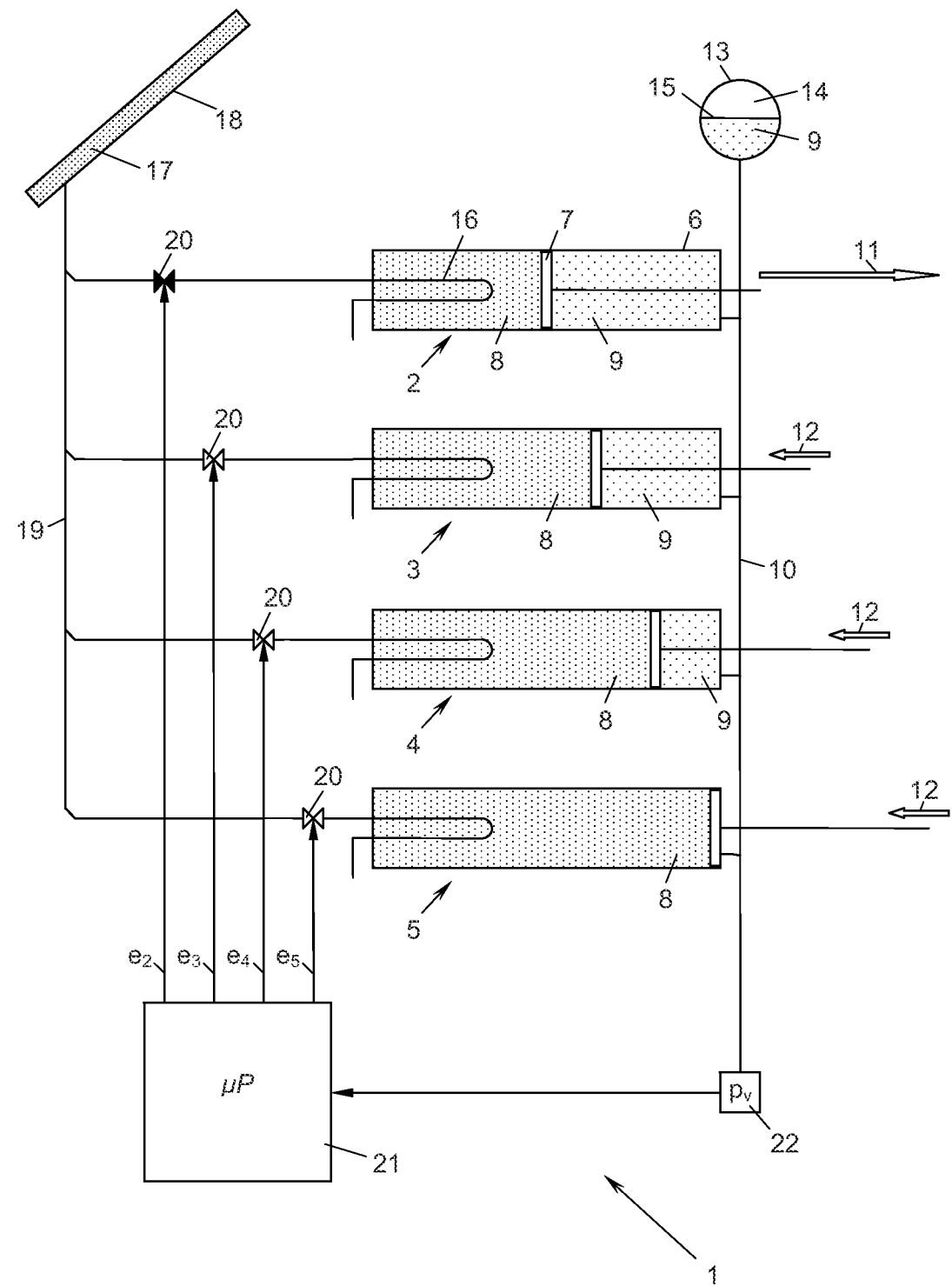
FIG. 1 is a basic circuit diagram of a heat engine of the invention with four cylinder-piston units.

FIG. 1 shows a heat engine 1 with four cylinder-piston units 2-5. Each cylinder-piston unit 2-5 has a cylinder 6, in which a piston 7 can move between a retracted position (shown at 2) and an extended position (shown at 5).

The space in the cylinder 6 to the left side of the piston 7 is completely occupied by an expansion fluid 8. The expansion fluid 8 has a high coefficient of thermal expansion and expands during heating in order to move the piston 7 from the retracted position into the extended position, or contracts during cooling to move the piston 7 back again.

In the shown example, the expansion fluid 8 is liquid carbon dioxide ($CO_2$), which has a condensation pressure of approx. 65 bar at room temperature. Liquid $CO_2$ has a thermal expansion of about 2.2-fold in the range from 20° C. to 30° C. Mixtures of liquid carbon dioxide with other substances could also be used as expansion fluid 8 instead of pure carbon dioxide.

To keep the $CO_2$ as expansion fluid 8 in its liquid state, the piston 7 is subjected to or prestressed in the direction of the expansion fluid 8 with a prestressing pressure $p_v$ higher than or equal to the condensation pressure.

As shown in FIG. 1, the prestressing pressure $p_v$ is exerted by a prestressing fluid 9, which directly acts on the side of each piston 7 remote from the expansion fluid 8. The prestressing fluid 9 is preferably a hydraulic oil and circulates in a hydraulic circuit 10 common to all the cylinder-piston units 2-5. The prestressing fluid 9 displaced when a piston 7 extends (arrow 11) thus maintains the prestressing pressure $p_v$ on the expansion fluids 8 of the retracting pistons 7 (arrows 12). The retraction movement of the pistons 7 is thus supported in the cooling phase and the pressure is prevented from dropping below the condensation pressure in the cooling phase.

The hydraulic circuit 10 is fitted with a flexible intermediate reservoir 13, e.g. a pressure tank with gas filling means 14 and/or with a flexible membrane 15 in order to buffer short-term pressure fluctuations.

The heating of the expansion fluids 8 in the cylinder-piston units 2-5 is conducted by means of controllable heat supply elements 16-20. In the shown example, the heat supply elements 16-19 comprise a heat exchanger 16 for each cylinder-piston unit 2-5, which is in contact with the expansion fluid 8 in a thermally conductive manner and in which a heat transfer medium 17 circulates. The heat transfer medium 17 is heated by a solar panel 18 in a heat transfer circuit 19 (return pipes not shown in FIG. 1 for reasons of clarity).

The heat exchangers 16 can be of any type known in the art. They are preferably fitted with heat pipes to promote the heat exchange and for rapid and uniform distribution of the supplied heat in the expansion fluids 8.

Each heat exchanger 16 is provided with a controllable shut-off valve 20. The shut-off valves 20 are alternately and intermittently opened by a central control means 21 in order to alternately heat and cool each cylinder-piston unit 2-5, and thus alternately expand and contract the expansion fluids 8 in the cylinders 6 and ultimately move the pistons 7 back and forth, wherein the piston movements are synchronised by means of the prestressing fluid 9 of the hydraulic circuit 10.

The control means 21, e.g. a microprocessor, operates the shut-off valves 20 in dependence on a measured value of the prestressing pressure $p_v$, which it receives from a pressure gauge 22 connected to the hydraulic circuit 10. In this case, the control target of the control means 21 is to keep the prestressing pressure $p_v$ in the hydraulic circuit 10 within the predetermined range. This is achieved primarily by controlling the number of the cylinder-piston units 2-5 currently in the heating phase at a specific time point in relation to the number of the other cylinder-piston units 2-5 that are currently in the cooling phase at this time point, as will now be explained in more detail on the basis of FIG. 2.

Figure 2A:
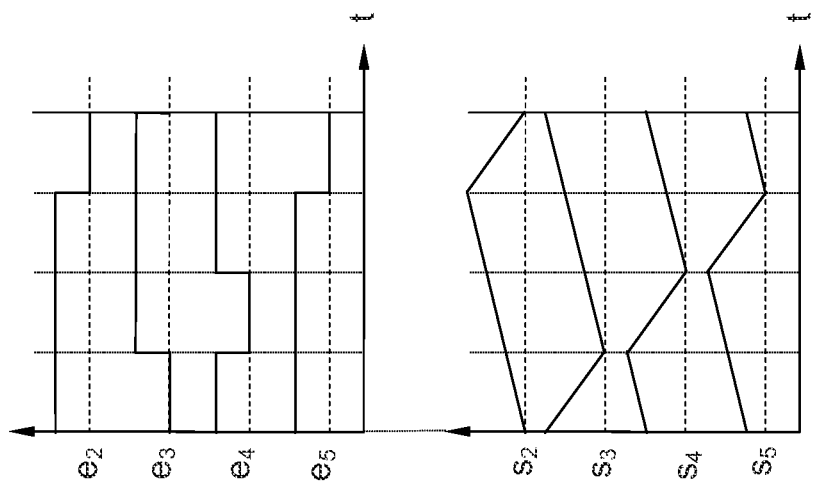
FIGS. 2a to 2c are time diagrams relating to the control of the heat supply elements and the thus resulting piston movements of the engine of FIG. 1.
Figure 2B:
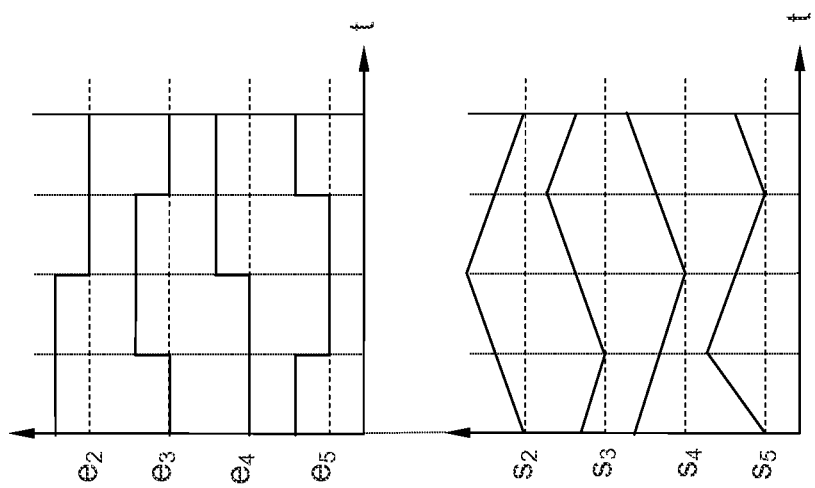
Figure 2C:
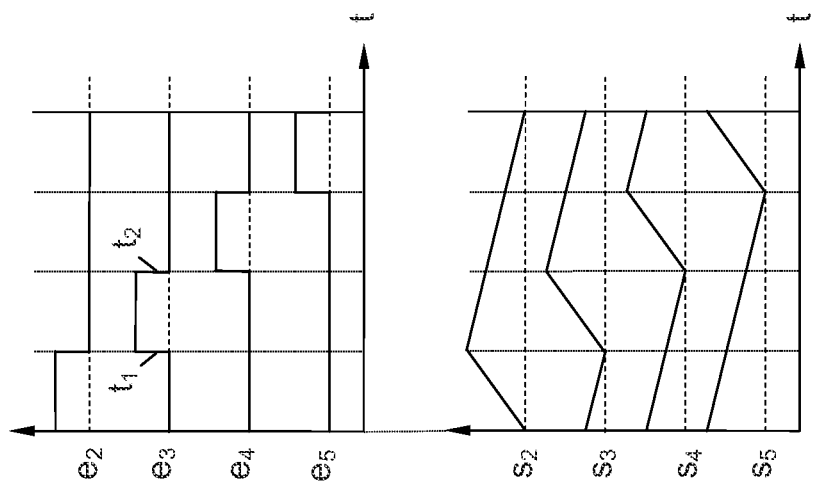

The switching signals $e_2$-$e_5$ of the control means 21 for opening the shut-off valves 20 are respectively recorded in the upper time diagrams of FIGS. 2a-2c and the movements or paths $s_2$-$s_5$ of the pistons 7 of the cylinder-piston units 2-5 resulting therefrom are plotted in relation to time t in the lower time diagrams.

FIG. 2a shows a first operating state of the heat engine 1 for ambient conditions, in which the cooling phase of the expansion fluid 8 is about three times as long as the heating phase, e.g. because the temperature of the heat transfer medium 17 is high and causes a rapid heating. The shut-off valves 20 are respectively opened cyclically for about a quarter of the stroke periods. As may be seen, at a specific time point one cylinder-piston unit 2-5 is always located in the heating phase and three others are in the cooling phase, i.e. the ratio of expanding cylinder-piston units 2-5 to contracting cylinder-piston units 2-5 amounts to 1:3 here.

FIG. 2b shows a second operating state of the heat engine 1, in which the shut-off valves 20 are respectively opened cyclically for half a stroke period. The ratio of cylinder-piston unit 2-5 in the heating phase to cylinder-piston units 2-5 in the cooling phase amounts to 2:2 here, which takes into account heating and cooling phases of about equal length, e.g. because of reduced heat supply.

If, for example, the temperature of the heat transfer medium 17 decreases even further and the heating phase is thus extended even further, the control means 20 moves into the third operating state of FIG. 2c, in which the ratio of cylinder-piston units 2-5 in the heating phase to cylinder-piston units 2-5 in the cooling phase amounts to 3:1.

The respective operating state of FIG. 2a, FIG. 2b or FIG. 2c is set by the control means 21 in dependence on the prestressing pressure $p_v$: if the prestressing pressure $p_v$ drops below a predetermined lower limit $p_{min}$, in particular the condensation pressure of the expansion fluid 8 at the current operating temperature, the ratio of cylinder-piston units 2-5 in the heating phase to cylinder-piston units 2-5 in the cooling phase increases successively, e.g. 1:3→2:2→3:1; if the prestressing pressure $p_v$ exceeds a predetermined upper limit $p_{max}$, in particular the condensation pressure plus a hysteresis threshold, then this ratio decreases successively, e.g. 3:1→2:2→1:3.

It is understood that the discussed control can be extended to any desired numbers of cylinder-piston units 2-5, e.g. to 3, 5, 6, 7, 8, 12, 24 etc. cylinder-piston units. The more cylinder-piston units there are available, the more finely stepped the control can be.

For the fine control, the control means 21 can additionally reduce or extend each individual heating or cooling phase, e.g. by shifting the beginning $t_1$ of a heating phase and/or the beginning $t_2$ of a cooling phase or by changing the duration $t_2-t_1$. If heating or cooling phases of different cylinder-piston units 2-5 overlap one another briefly in this case to a higher or lower ratio than that selected by means of the primary control (1:3, 2:2, 3:1), corresponding short-term pressure fluctuations of the prestressing pressure $p_v$ can be temporarily absorbed by means of the intermediate reservoir 13 in the hydraulic circuit 10.

It must be mentioned at this point that in a greatly simplified embodiment of the heat engine 1, which only comprises two cylinder-piston units and thus only allows the single ratio 1:1, the control means 21 can also only perform the last-mentioned control with corresponding restriction with respect to the usable operating conditions.

Figure 3:
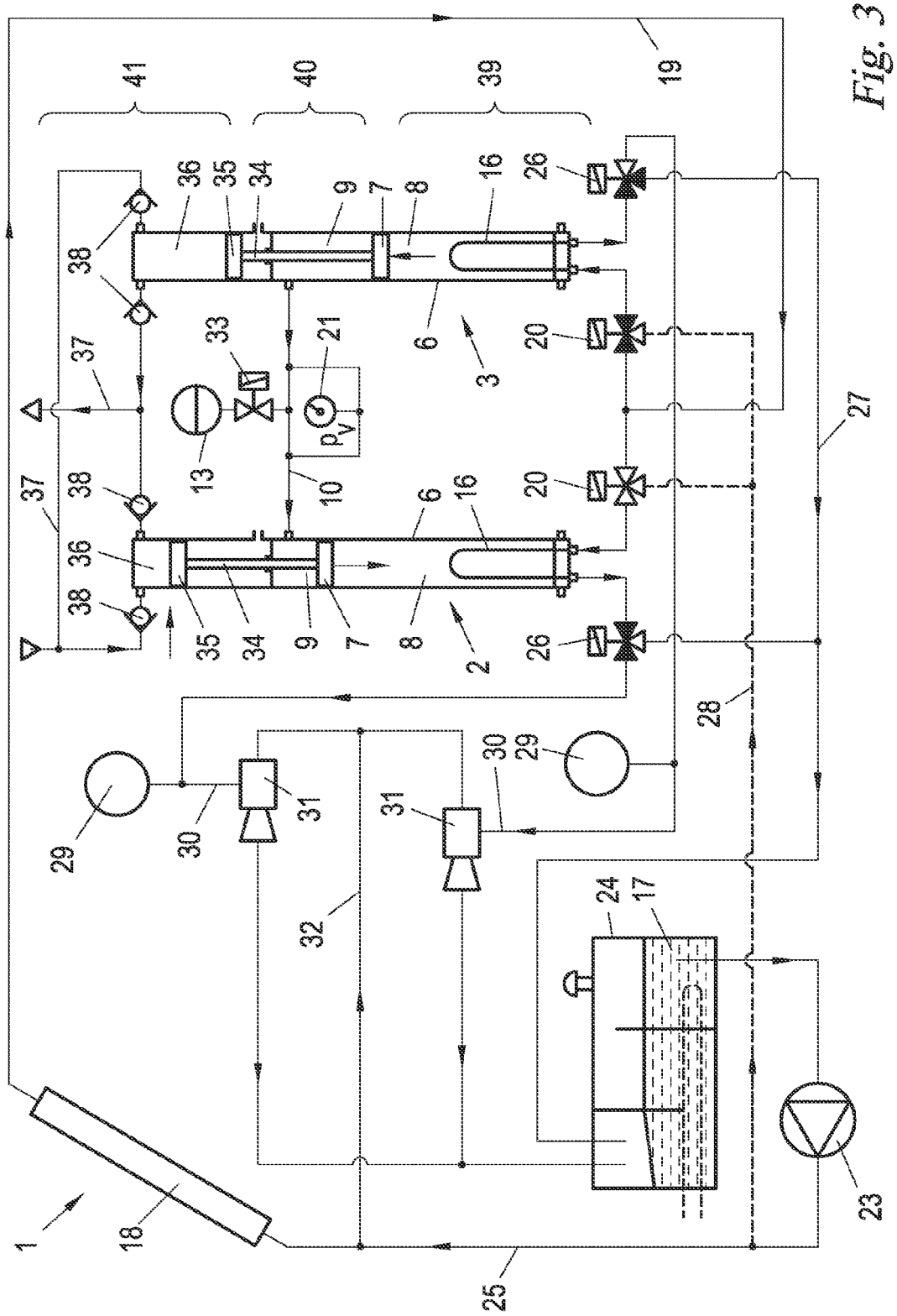
FIG. 3 is a circuit diagram of a practical embodiment of a heat engine according to the invention with two exemplary cylinder-piston units.

FIG. 3 shows a specific configuration and further development of the heat engine 1 of FIG. 1, wherein for reasons of clarity only two cylinder-piston units 2, 3 are shown as representative and the control means 21 with its measurement and control lines is not shown. However, it is understood that the embodiment shown in FIG. 3 can be extended to any desired number of cylinder-piston units.

According to FIG. 3 a pump 23 pumps heat transfer medium 17, e.g. refrigerant R 123 from Hoechst, from a reservoir 24 via a pipe 25 to the solar panel 18, from there via pipe 19 and shut-off valves 20 to the heat exchangers 16 and from there back to the reservoir 24 via switch valves 26 and a return pipe 27. In the operating state shown in FIG. 3 the right shut-off valve 20 is currently open and the left shut-off valve 20 is closed, so that the right cylinder-piston unit 3 is in the heating and expansion phase and the left cylinder-piston unit 2 is in the cooling and contraction phase.

For acceleration of the cooling phases the heat supply elements 16-20 also comprise elements for forced cooling of the expansion fluids 8 here. The forced cooling elements can be an optional feed path 28 for non-heated heat transfer medium 17, for example, in order to feed this into the heat exchanger 16 in the cooling phases via shut-off valves 20 configured as multiple-way valves. Alternatively, separate heat exchangers could be used for a separate cooling medium (not shown).

The forced cooling elements preferably comprise a controllable pressure release means, as shown, which after the shut-off valve 20 closes relieves the heat transfer medium 17 that is still under the transport pressure of the pump 23 in a heat exchanger 16 via the shut-off valve 26 to a vacuum intermediate reservoir 29. The vacuum in the vacuum intermediate reservoir 29 is created via a suction pipe 30 of a venturi ejector 31, which is continuously fed with heat transfer medium 17 in the circuit by the pump 23 via a pipe 32. As a result of the sudden expansion of the heat transfer medium 17 after the shut-off valve 26 is opened, the heat transfer medium 17 evaporates and thus cools the expansion fluid 8 via the heat exchanger 16.

In the embodiment of FIG. 3, the flexible intermediate reservoir 13 of the hydraulic circuit 10 can be selectively switched to the hydraulic circuit 10 via its own shut-off valve 33. The power of the cylinder-piston units 2, 3 is mechanically transferred via piston rods 34 to working pistons 35, which act on a common working fluid 36, e.g. hydraulic oil, that circulates in a hydraulic load circuit 37 via check valves 38.

The working pistons 35 can be integrated into the cylinders 6 of the cylinder-piston units 2, 3, so that these have three operating zones: a reaction zone 39, in which the expansion fluids 8 operate, a prestressing zone 40, in which they are coupled via the prestressing fluids 9, and a working zone 41, in which the movement is decoupled via the working fluid 36. The working pressure of the working fluid 36 substantially corresponds to the thermal expansion-related reaction pressure of the expansion fluid 8 minus the prestressing pressure $p_v$ of the prestressing fluid 9.

The invention is not restricted to the represented embodiments, but covers all variants and modifications that fall within the framework of the attached claims. Thus, for example, a larger number of cylinder-piston units could also be actuated synchronously group by group in several groups to reduce the switching and control expenditure. In this case, the cylinders 6 of a synchronous group of cylinder-piston units could also share a common heat exchanger 16 and/or a common expansion fluid 8.

What is claimed is:

1. Heat engine comprising:
    at least two cylinder-piston units, each containing an expansion fluid, which acts on a first side of the piston and which expansion fluid changes its volume in the case of a change of temperature and thus moves the piston,
    heat supply elements for the individually controllable supply of heat to the expansion fluid of each cylinder-piston unit,
    a control means configured to control the heat supply elements to allow each expansion fluid to alternately heat up and cool down and thus move the pistons,
    a prestressing fluid circulating in a hydraulic circuit, the circuit including a common header connected for communication of the prestressing fluid to each of the cylinder-piston units for direct contact with a second side of the piston of each cylinder-piston unit in order to exert a common prestressing pressure on the expansion fluid in each cylinder-piston unit whereby when the control means controls one of the heat supply elements to heat the expansion fluid for expansion, the corresponding piston is moved by the expansion of the expansion fluid such that the prestressing fluid contacting the second side of the corresponding piston is exhausted from the corresponding cylinder-piston unit into the common header causing a corresponding increase in the prestressing pressure within each of the other cylinder-piston units to maintain the common prestressing pressure as equal on all pistons of the cylinder-piston units;
a pressure gauge in communication with the prestressing fluid to measure the common prestressing pressure;
the control means being in communication with the pressure gauge, and
the control means controlling a heating and cooling phase of the heat supply elements in dependence on the measured common prestressing pressure in order to maintain the prestressing pressure within a predetermined range.

2. Heat engine according to claim 1, wherein the minimum pressure of said predetermined range is higher than or equal to a condensation pressure of the expansion fluid and the maximum pressure of said predetermined range is the condensation pressure of the expansion fluid plus a hysteresis threshold.

3. Heat engine according to claim 1, wherein the control means reduces or extends the heating and/or cooling phases individually in each cylinder-piston unit in order to hold the common prestressing pressure within the predetermined range.

4. Heat engine according to claim 1, wherein the expansion fluid is liquid carbon dioxide and the common prestressing pressure is maintained at a pressure at least higher than or equal to the condensation pressure of carbon dioxide at operating temperature.

5. Heat engine according to claim 1, wherein the prestressing fluid is hydraulic fluid.

6. Heat engine according to claim 5, wherein the hydraulic circuit of the prestressing fluid is fitted with a flexible intermediate reservoir.

7. Heat engine according to claim 1, wherein the pistons of each of the cylinder-piston units are double-action pistons, the expansion fluid acting on one side thereof and the prestressing fluid acting on the other side thereof.

8. Heat engine according to claim 1, wherein each cylinder-piston unit drives a working piston and all working pistons act on a common working fluid of a hydraulic load.

9. Heat engine according to claim 1, wherein the heat supply elements for each cylinder-piston unit have a heat exchanger, through which a heat transfer medium flows and which is provided with a shut-off valve controlled by the control means.

10. Heat engine according to claim 9, wherein the heat supply elements additionally comprise elements for forced cooling of the expansion fluids in the cooling phases, and further wherein the heat transfer medium stands under pressure in the heating phase and the forced cooling elements have a controllable pressure release means for each heat exchanger.

11. Heat engine according to claim 10, wherein the pressure release means comprises a vacuum intermediate reservoir, which can be connected to the heat exchanger by means of a controllable switch valve.

12. Heat engine according to claim 1 with at least three cylinder-piston units, wherein the control means increases the number of cylinder-piston units, which are in the heating phase at a point in time, in relation to the number of cylinder-piston units, which are in the cooling phase at the same point in time, if the common prestressing pressure drops below the condensation pressure of the expansion fluid, and reduces same if the common prestressing pressure exceeds condensation pressure of the expansion fluid plus a hysteresis threshold.

13. Heat engine according to claim 12, wherein the control means reduces or extends the heating and/or cooling phases individually in order to hold the prestressing pressure within the predetermined range.

14. Heat engine according to claim 1, wherein the heat supply elements additionally comprise elements for forced cooling of the expansion fluids in the cooling phases.

15. A heat engine comprising:
at least two cylinder-piston units, wherein each cylinder-piston unit contains an expansion fluid which changes volume in response to a change in temperature to move a piston;
individually controllable heat supply elements in thermally conductive contact with the expansion fluid in each cylinder-piston unit;
a control means for controlling each of the heat supply elements to alternatively heat up and cool down the expansion fluid to move the pistons;
a prestressing fluid circulating in a hydraulic circuit, the circuit including a common header connected for communication of the prestressing fluid to each of the cylinder-piston units for direct contact with a side of the piston opposite the expansion fluid of each cylinder-piston unit in order to exert a common prestressing pressure on the expansion fluid in each cylinder-piston unit whereby when the control means controls one of the heat supply elements to heat the expansion fluid for expansion, the corresponding piston is moved by the expansion of the expansion fluid such that the prestressing fluid contacting the second side of the corresponding piston is exhausted from the corresponding cylinder-piston unit into the common header causing a corresponding increase in the prestressing pressure within each of the other cylinder-piston units to maintain the common prestressing pressure as equal on all pistons of the cylinder-piston units;
a pressure gauge in communication with the prestressing fluid to measure the common prestressing pressure and in communication with the control means, wherein the control means controls the heat supply elements in dependence on the measured common prestressing pressure in order to maintain the prestressing pressure within a predetermined range.

16. A heat engine according to claim 15, wherein the maximum prestressing pressure is the condensation pressure of the expansion fluid plus a hysteresis threshold.

17. A heat engine according to claim 15, wherein the control means reduces or extends the heating and/or cooling phases individually in each cylinder-piston unit in order to hold the common prestressing pressure within the predetermined range.

18. A heat engine according to claim 15, wherein the expansion fluid is liquid carbon dioxide.

19. A heat engine according to claim 15, further comprising at least three cylinder-piston units and wherein the control means increases the number of cylinder-piston units which are in the heating phase at a point in time in relation to the number of cylinder-piston units which are in the cooling phase at the same point in time if the common prestressing pressure drops below the condensation pressure of the expansion fluid, and wherein the control means reduces the number of cylinder-piston units in the heating phase if the common prestressing pressure exceeds the condensation pressure of the expansion fluid plus a hysteresis threshold.

20. A heat engine according to claim 15, wherein the heat supply elements are heat exchangers.

21. A heat engine according to claim 15, wherein the control means is a microprocessor and each heat supply element is controlled via a shut-off valve.

* * * * *